US012166300B2

(12) United States Patent
Gao et al.

(10) Patent No.: US 12,166,300 B2

(45) Date of Patent: Dec. 10, 2024

(54) ELECTRICAL CONNECTOR HAVING 10G OR 25G TERMINAL MODULE WITH SAME PIN ARRANGEMENT PATTERN

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Sheng-Pin Gao, Kunshan (CN); Yong-Chun Xu, Kunshan (CN); Hung-Chi Yu, New Taipei (TW); Chih-Ching Hsu, New Taipei (TW); Jie Zhang, Kunshan (CN); Chin-Jung Wu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 337 days.

(21) Appl. No.: 17/704,392

(22) Filed: Mar. 25, 2022

(65) Prior Publication Data

US 2022/0311160 A1 Sep. 29, 2022

(30) Foreign Application Priority Data

Mar. 26, 2021 (CN) ......................... 202110325047.5

(51) Int. Cl.

*H01R 13/514* (2006.01)
*H01R 12/51* (2011.01)
*H01R 12/57* (2011.01)
*H01R 13/20* (2006.01)
*H01R 24/64* (2011.01)

(52) U.S. Cl.

CPC ........... *H01R 12/515* (2013.01); *H01R 12/57* (2013.01); *H01R 13/20* (2013.01); *H01R 13/514* (2013.01); *H01R 24/64* (2013.01)

(58) Field of Classification Search

CPC ...... H01R 12/515; H01R 12/57; H01R 13/20; H01R 13/514; H01R 24/64

USPC .......................................................... 439/701

See application file for complete search history.

(56) References Cited

U.S. PATENT DOCUMENTS

| | | | | |
|---|---|---|---|---|
| 7,052,315 B2 * | 5/2006 | Murr | .................. | H01R 13/6658 439/541.5 |
| 7,241,181 B2 | 7/2007 | Machado | | |
| 7,367,851 B2 | 5/2008 | Machado et al. | | |
| 8,774,639 B2 * | 7/2014 | Tang | ...................... | H04B 10/40 398/139 |
| 8,992,248 B2 | 3/2015 | O'Malley | | |
| 9,178,318 B2 | 11/2015 | Rascon et al. | | |

(Continued)

*Primary Examiner* — Abdullah A Riyami
*Assistant Examiner* — Vladimir Imas
(74) *Attorney, Agent, or Firm* — Ming Chieh Chang

(57) ABSTRACT

An electrical connector for mounting on an external circuit board includes: an insulating body having an upper receiving space and a lower receiving space; a terminal module assembled on the insulating body and including plural pin terminals, each pin terminal having a pin for mounting on the external circuit board, wherein the terminal module is capable of being modified to support 1G or 2.5G or 5G or 10G or 25G or 40G signal transmission while keeping arrangement pattern of the pins unchanged in order to be mounted on the same external circuit board.

4 Claims, 15 Drawing Sheets

(56) References Cited

U.S. PATENT DOCUMENTS

| | | | | |
|---|---|---|---|---|
| 9,246,276 | B2 | 1/2016 | Gao | |
| 9,252,530 | B2 * | 2/2016 | Zhang | H01R 13/6587 |
| 9,368,922 | B2 * | 6/2016 | Yen | H01R 13/6658 |
| 9,413,121 | B2 * | 8/2016 | Poulsen | H01R 13/6658 |
| 9,685,724 | B2 * | 6/2017 | Tojo | H01R 12/774 |
| 9,793,663 | B2 * | 10/2017 | Poulsen | H01R 24/64 |
| 10,038,285 | B2 * | 7/2018 | Harashima | H01R 24/60 |
| 10,290,983 | B2 * | 5/2019 | Harashima | H01R 24/60 |
| 10,566,752 | B2 * | 2/2020 | Tamai | H01R 43/205 |
| 11,296,439 | B2 * | 4/2022 | Lou | H01R 13/26 |
| 11,749,918 | B2 * | 9/2023 | Hsiao | H01R 4/027 439/78 |
| 2020/0313359 | A1 | 10/2020 | Feng | |
| 2021/0265751 | A1 * | 8/2021 | Lou | H01R 13/6582 |
| 2023/0216188 | A1 * | 7/2023 | Lee | H04B 1/525 343/702 |
| 2023/0411901 | A1 * | 12/2023 | Song | H01R 13/5219 |
| 2024/0250413 | A1 * | 7/2024 | Yin | H01Q 1/3233 |

* cited by examiner

ELECTRICAL CONNECTOR HAVING 10G OR 25G TERMINAL MODULE WITH SAME PIN ARRANGEMENT PATTERN

BACKGROUND OF THE INVENTION

1. Field of the Invention

The present invention relates generally to an electrical connector, and more particularly to an electrical connector that can be mounted to an external circuit board.

2. Description of Related Arts

At present, most data center construction is mainly based on 1G or 10G Ethernet architecture. In order to cope with the ever-increasing data traffic, the data center must realize the expansion of the bandwidth on the basis of 10G. However, as the transmission rate increases (i.e., the bandwidth increases), the crosstalk between two adjacent ports of a connector or between two adjacent channels increases. Increasing the distance between two adjacent ports is a way to solve excessive crosstalk, but this will lead to an increase in product size. If the connector width is increased in order to increase the transmission rate, as a result, the volume increases, and the customer needs to redesign the layout of the server or switch panel and mainboard, which cannot meet the customer's requirements.

Therefore, an improved electrical connector is desired.

SUMMARY OF THE INVENTION

A main object of the present invention is to provide an electrical connector, which can realize the transmission of signals at different rates on the basis that the pin size and arrangement of the existing connector remain unchanged, and is convenient for replacement and upgrade.

To achieve the above-mentioned object, an electrical connector for mounting on an external circuit board comprises: an insulating body having an upper receiving space and a lower receiving space; and a terminal module assembled on the insulating body and including a plurality of pin terminals, each pin terminal having a pin for mounting on the external circuit board, wherein the terminal module is capable of being modified to support 1G or 2.5G or 5G or 10G or 25G or 40G signal transmission while keeping arrangement pattern of the pins unchanged in order to be mounted on the same external circuit board.

Compared to prior art, in the electrical connector of the present invention, the terminal modules can be replaced with different types of terminal modules as required, and the sizes and arrangements of the pins of the different types of terminal modules are the same, so that electrical connectors of different speeds are compatible with the same external circuit board. In addition, the external dimensions of the electrical connector of the present invention remains unchanged, which can save installation space and cost, and is convenient for product upgrading.

DETAILED DESCRIPTION OF THE PREFERRED EMBODIMENT

Figure 1:
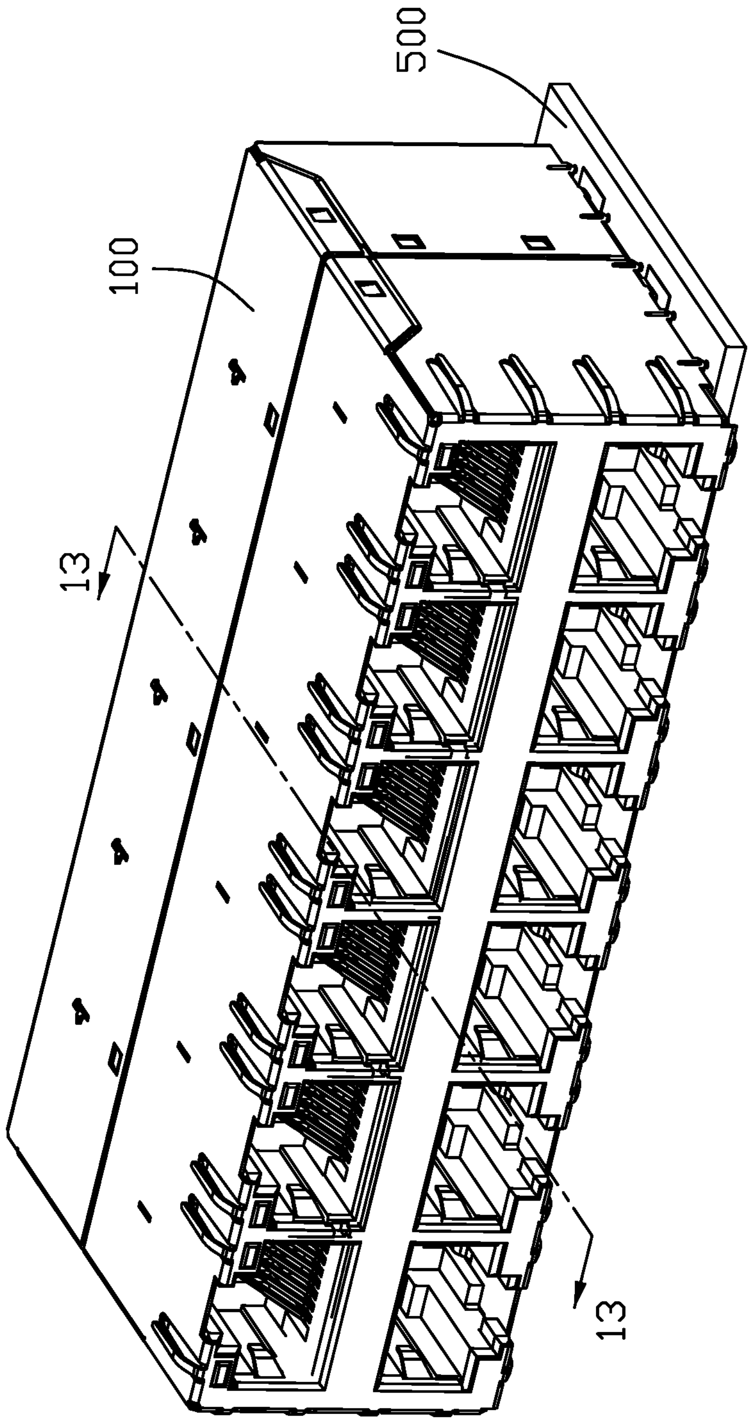
FIG. 1 is a perspective view of an electrical connector in accordance with the present invention after the external circuit board is mounted.
Figure 2:
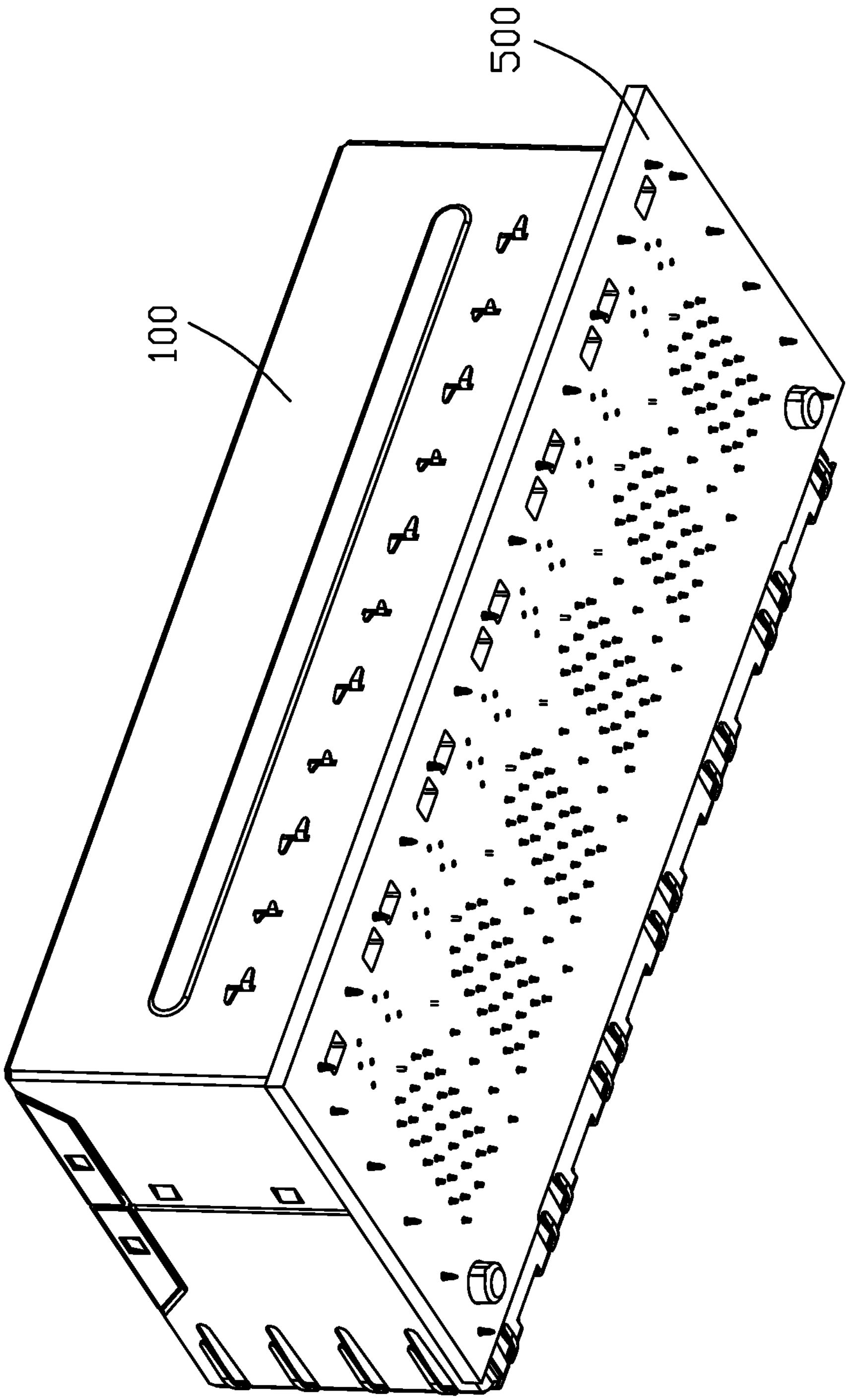
FIG. 2 is another perspective view of the electrical connector and the external circuit board in FIG. 1.
Figure 3:
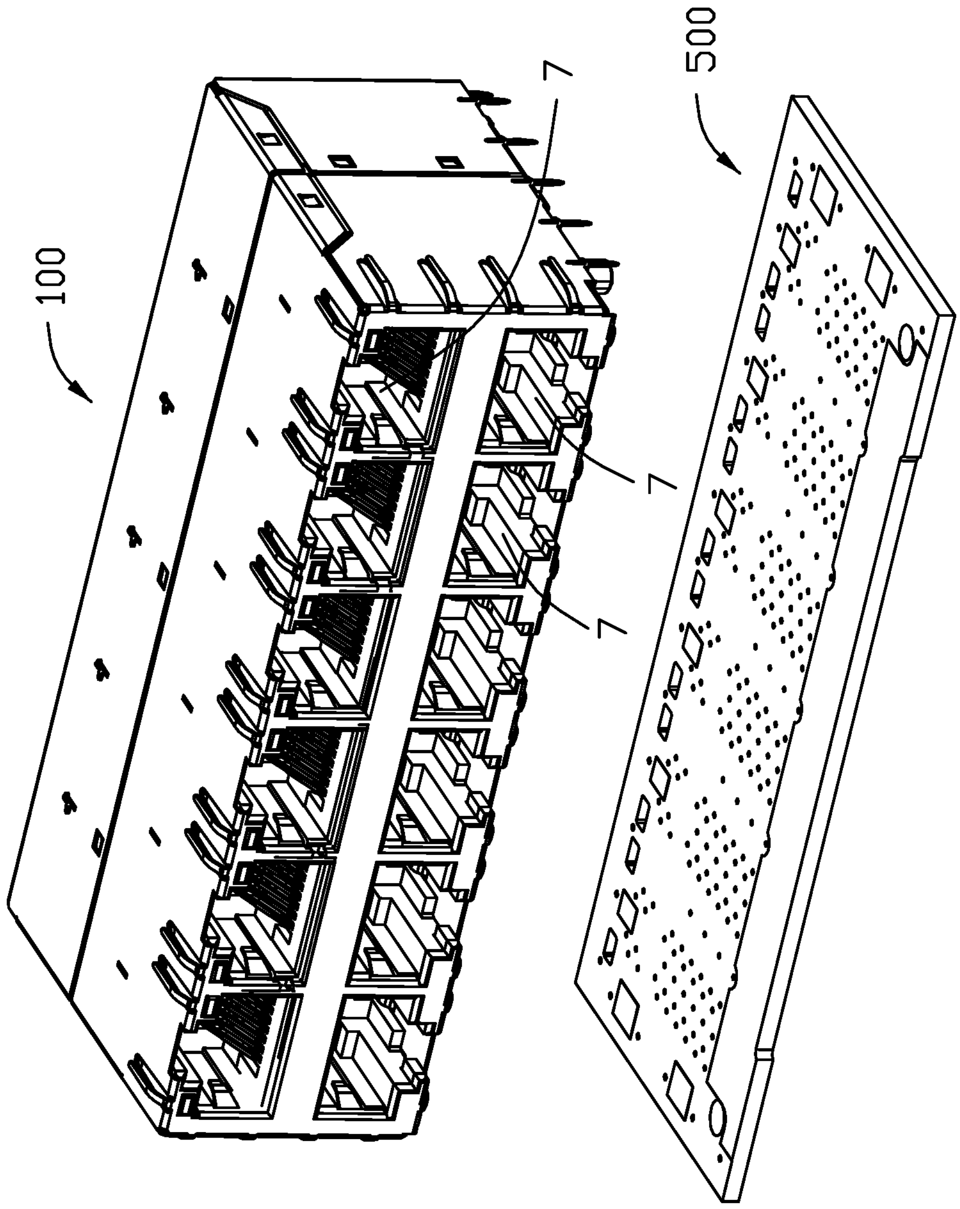
FIG. 3 is a perspective view of the electrical connector and the external circuit board in FIG. 2 without being mounted.
Figure 4:
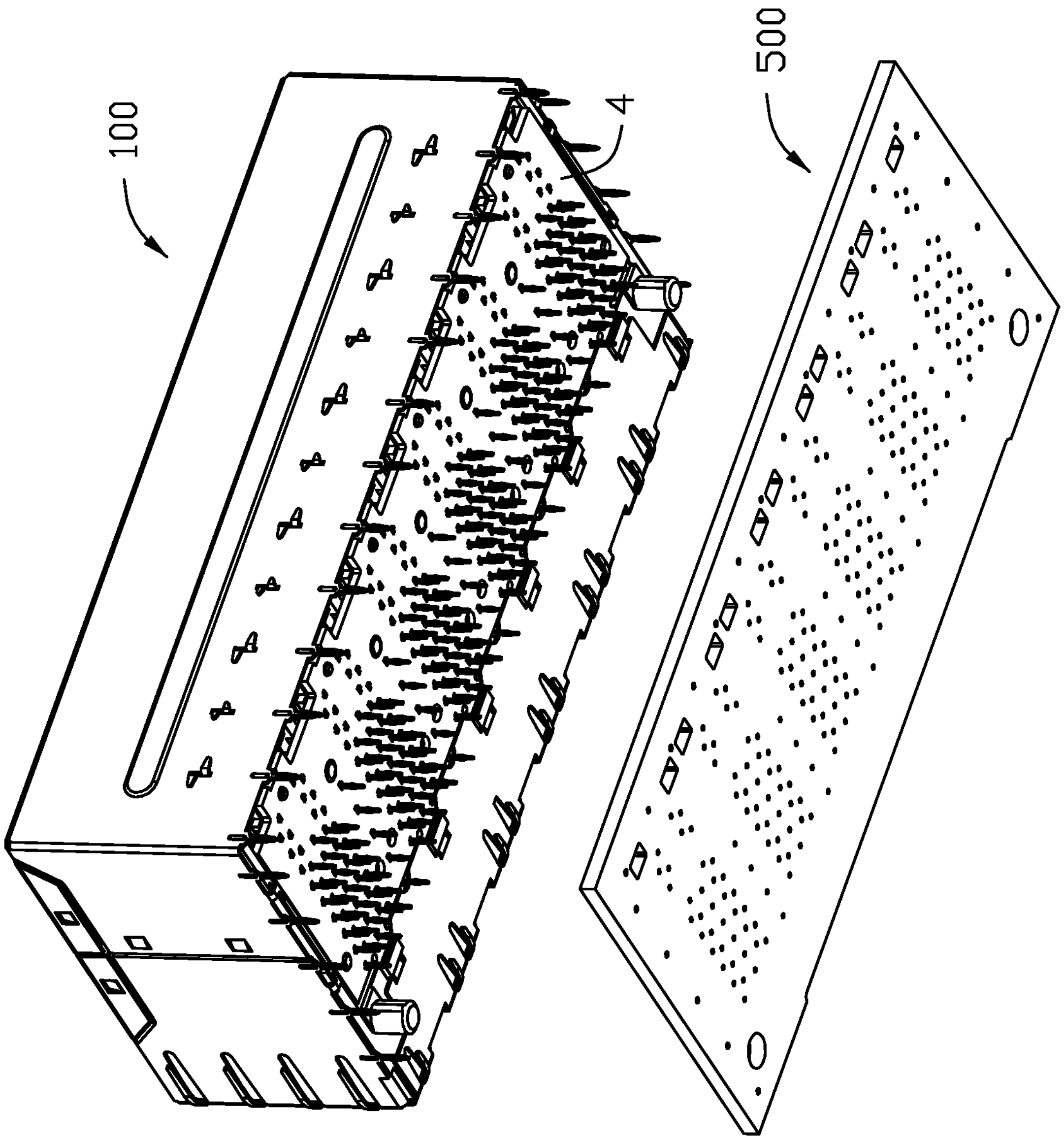
FIG. 4 is another perspective view of the electrical connector and the external circuit board in FIG. 3.
Figure 5:
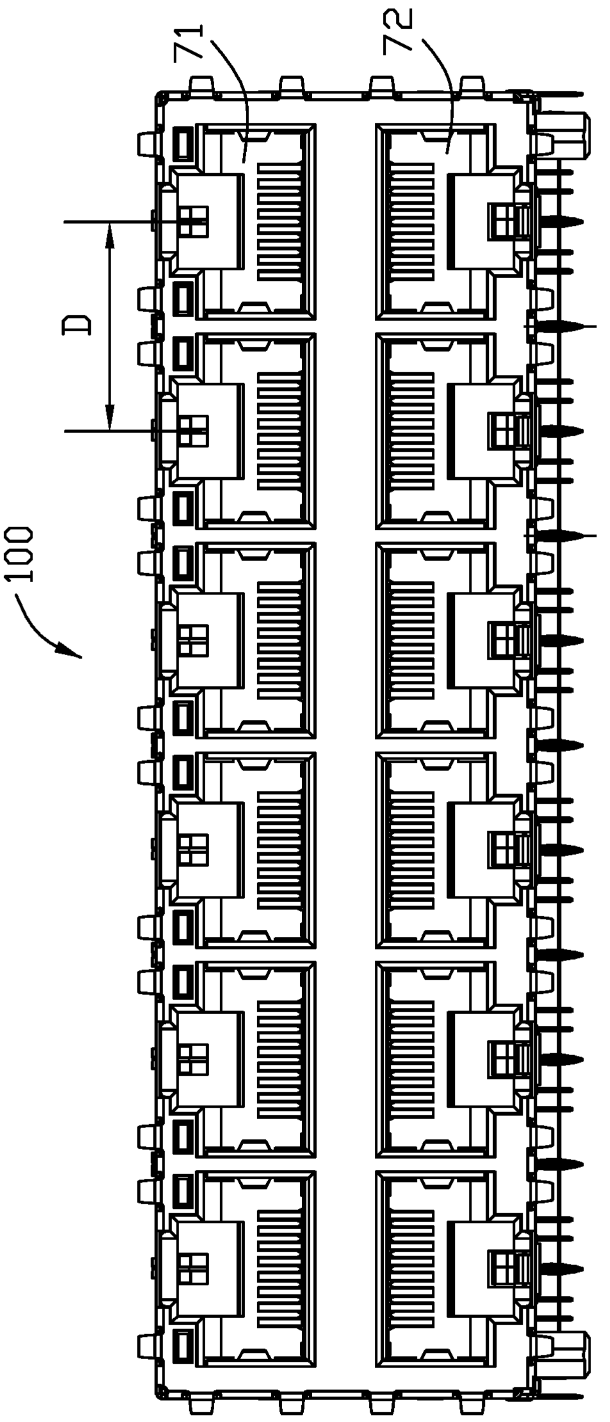
FIG. 5 is a front view of the electrical connector in FIG. 1.
Figure 6:
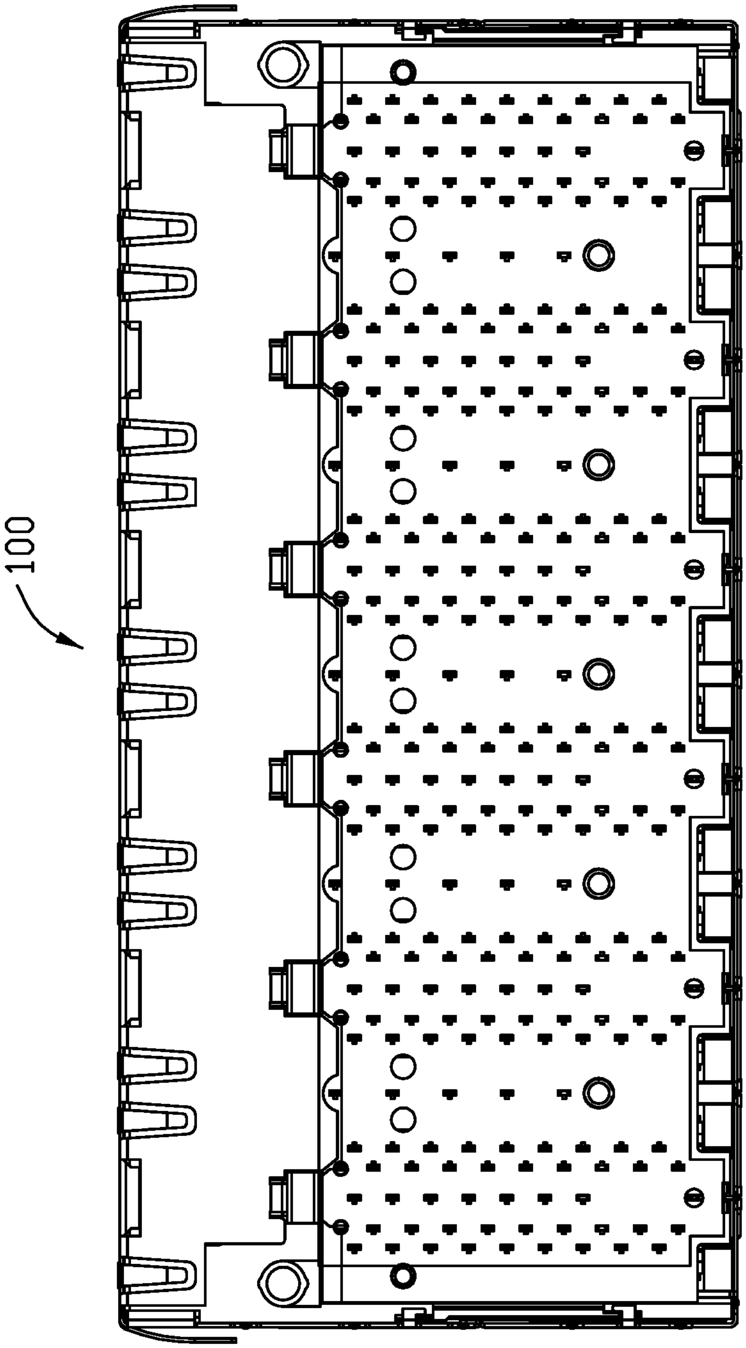
FIG. 6 is a bottom view of the electrical connector in FIG. 1.
Figure 7:
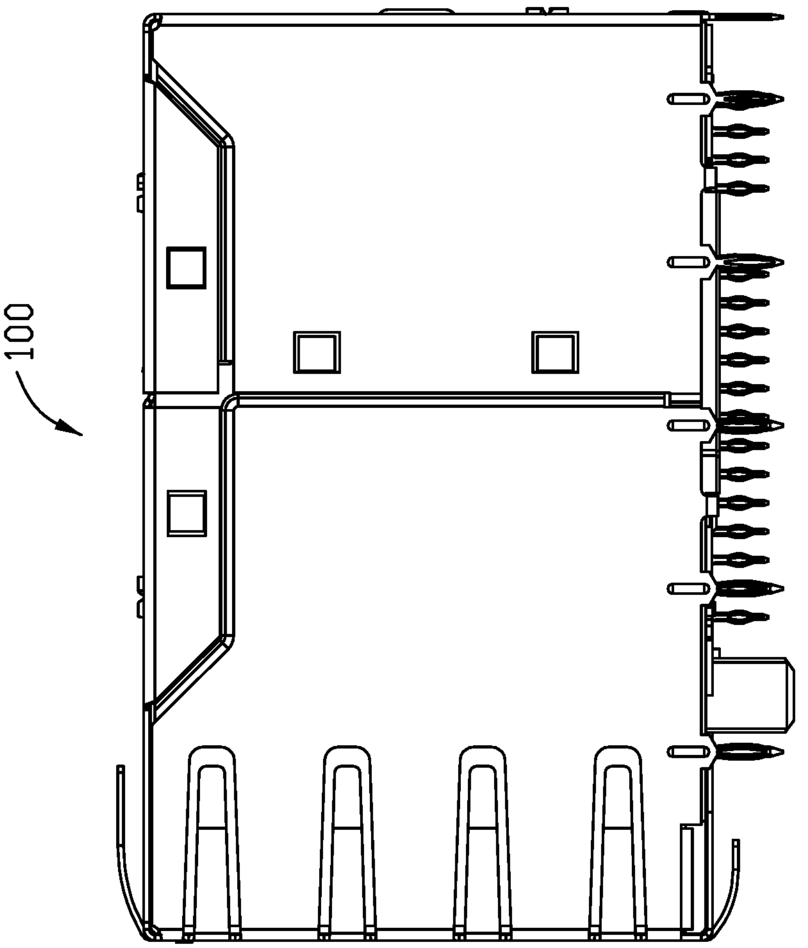
FIG. 7 is a right elevation of the electrical connector in FIG. 1.
Figure 8:
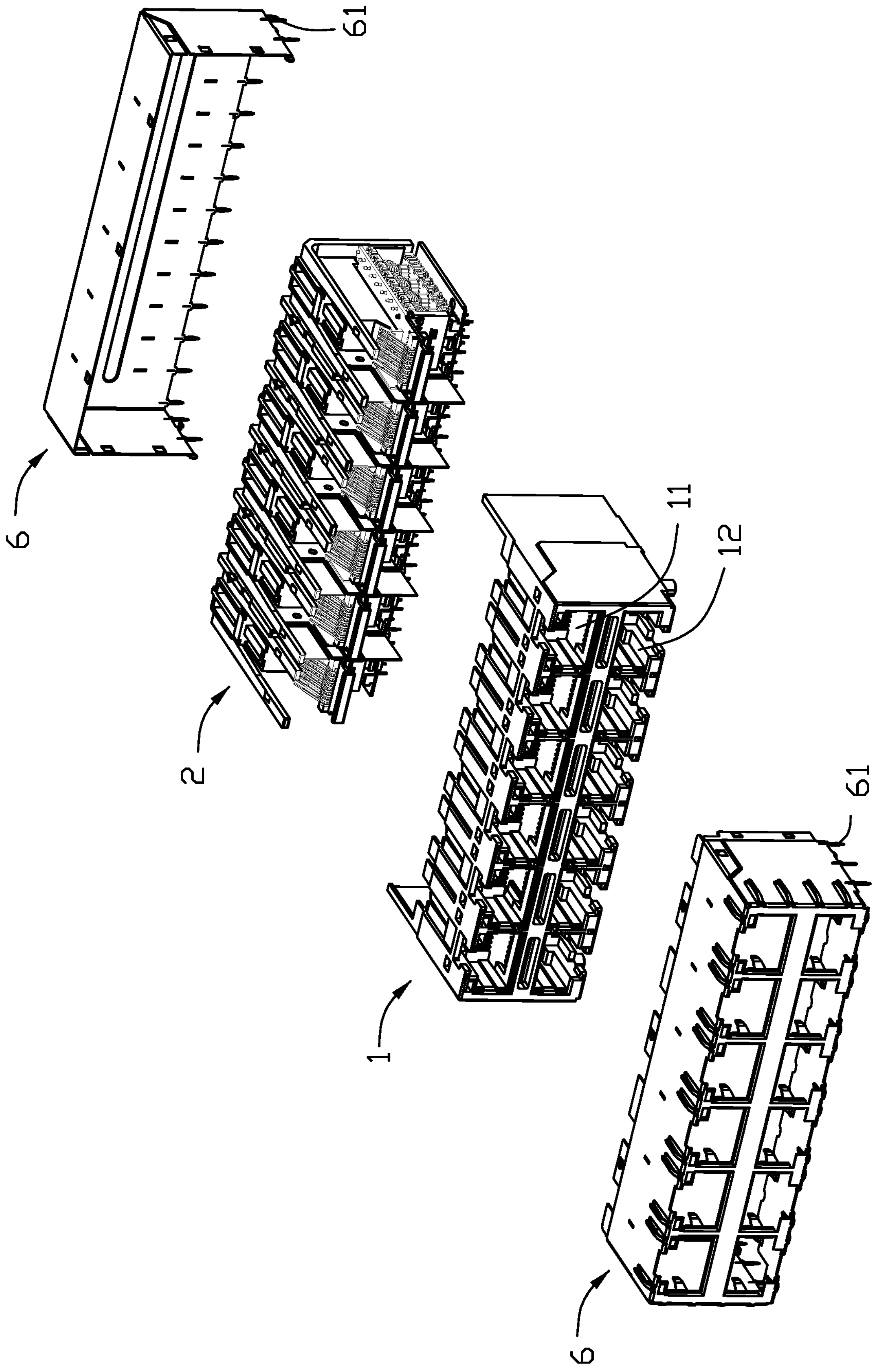
FIG. 8 is a partially exploded view of the electrical connector in FIG. 1.
Figure 9:
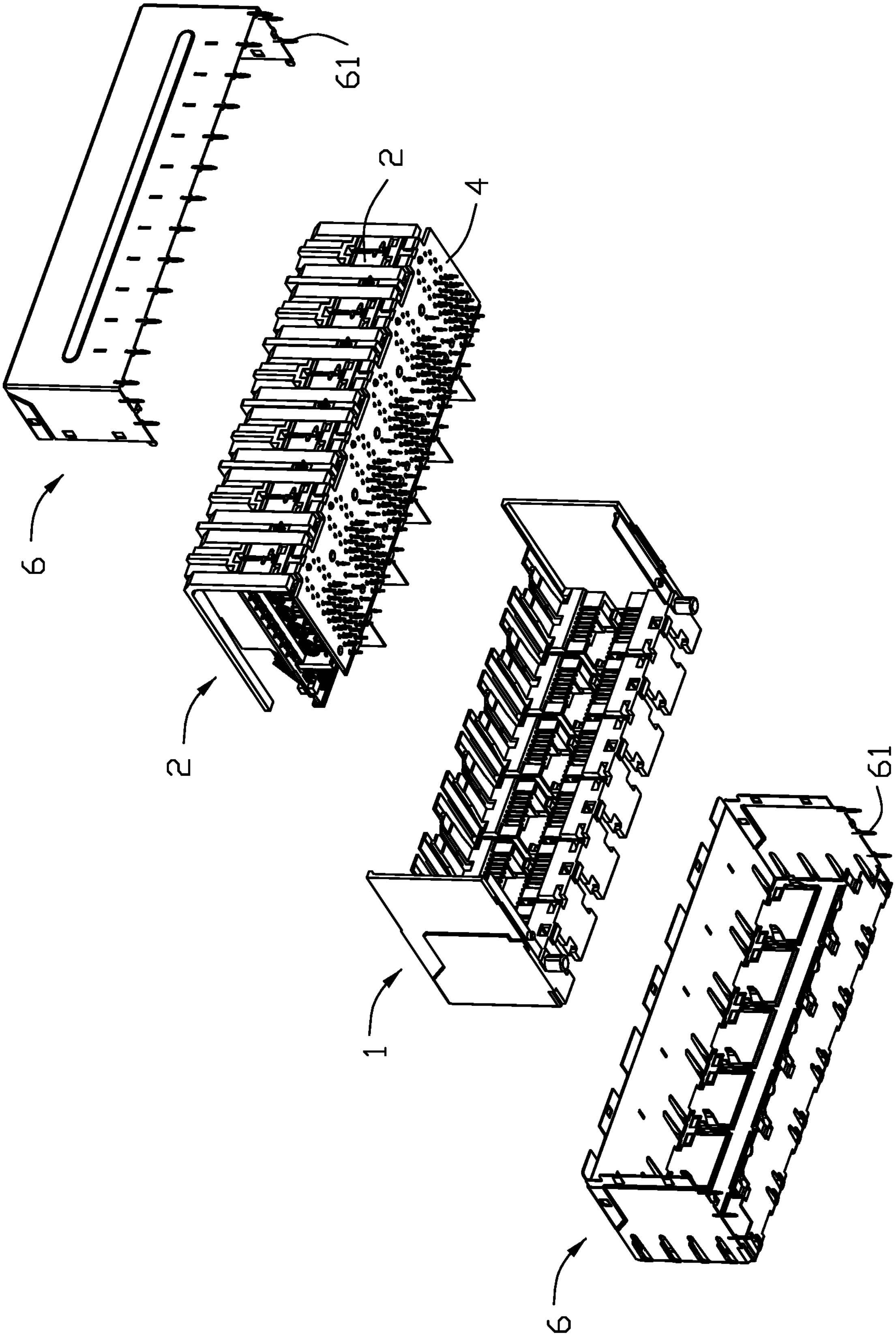
FIG. 9 is another perspective view of the electrical connector in FIG. 8.
Figure 10:
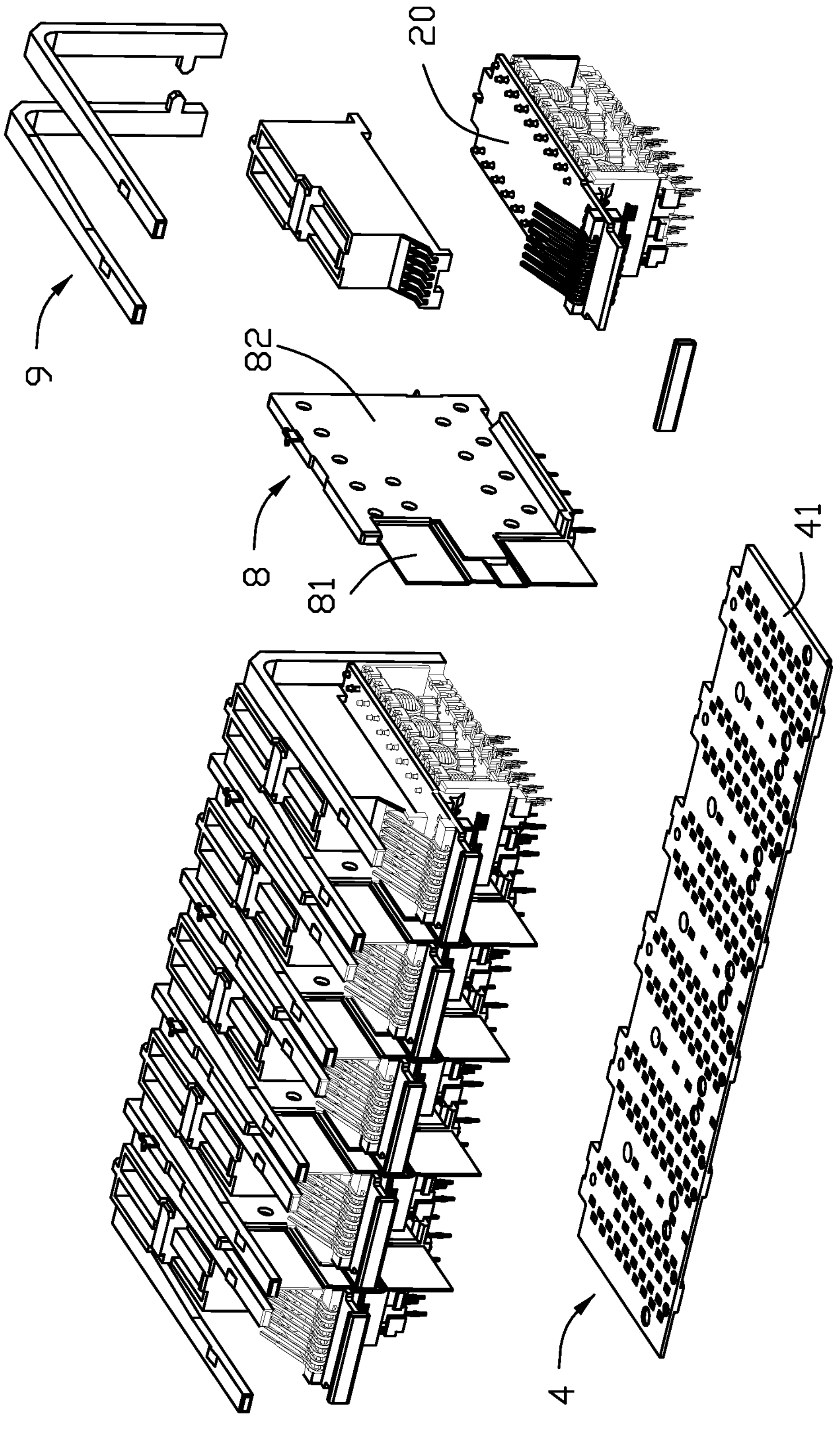
FIG. 10 is a further exploded view of the electrical connector in FIG. 8 with the metal shielding shell and insulating body removed.
Figure 11:
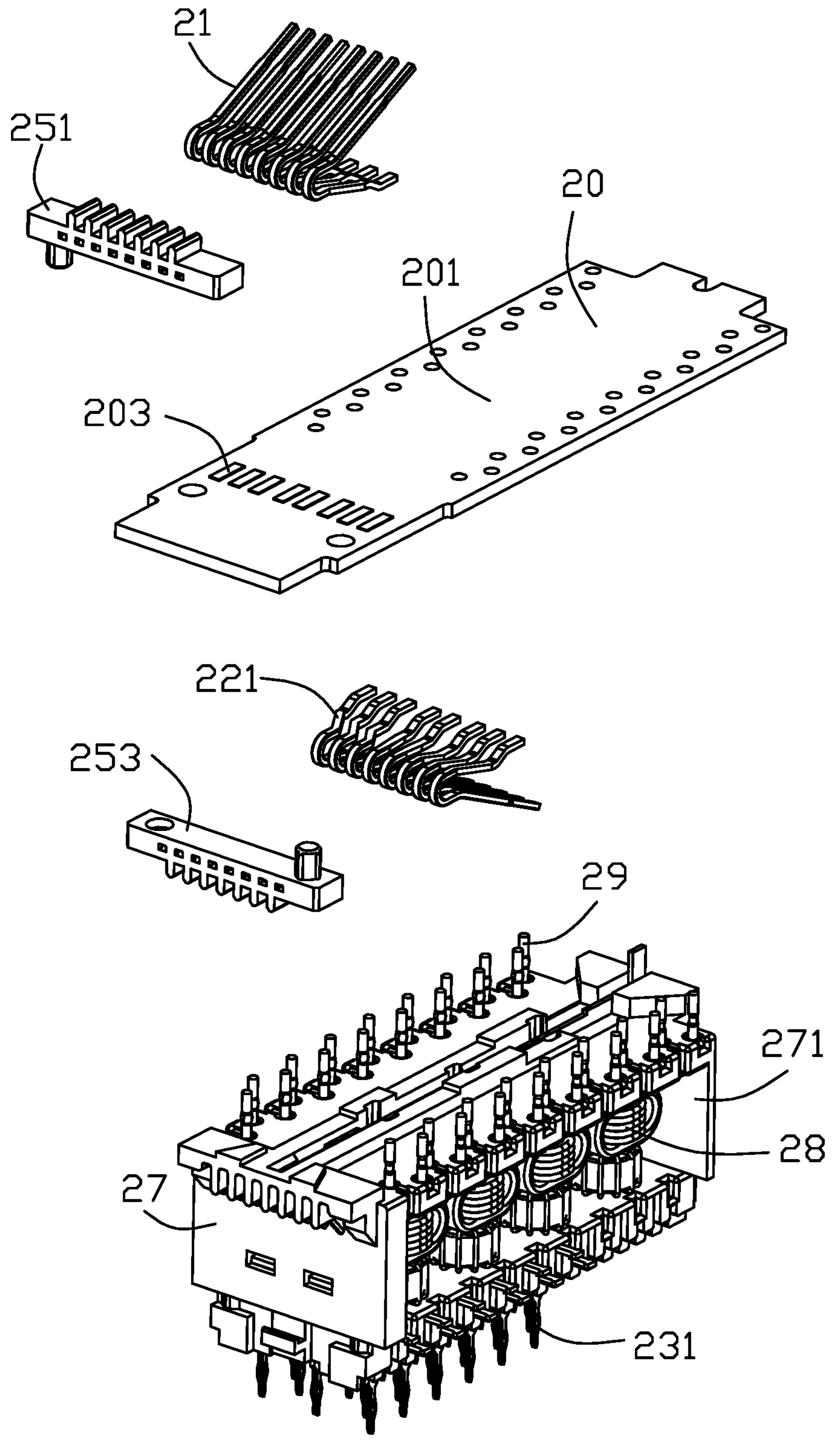
FIG. 11 is an exploded view of a terminal module of the electrical connector in FIG. 10.
Figure 12:
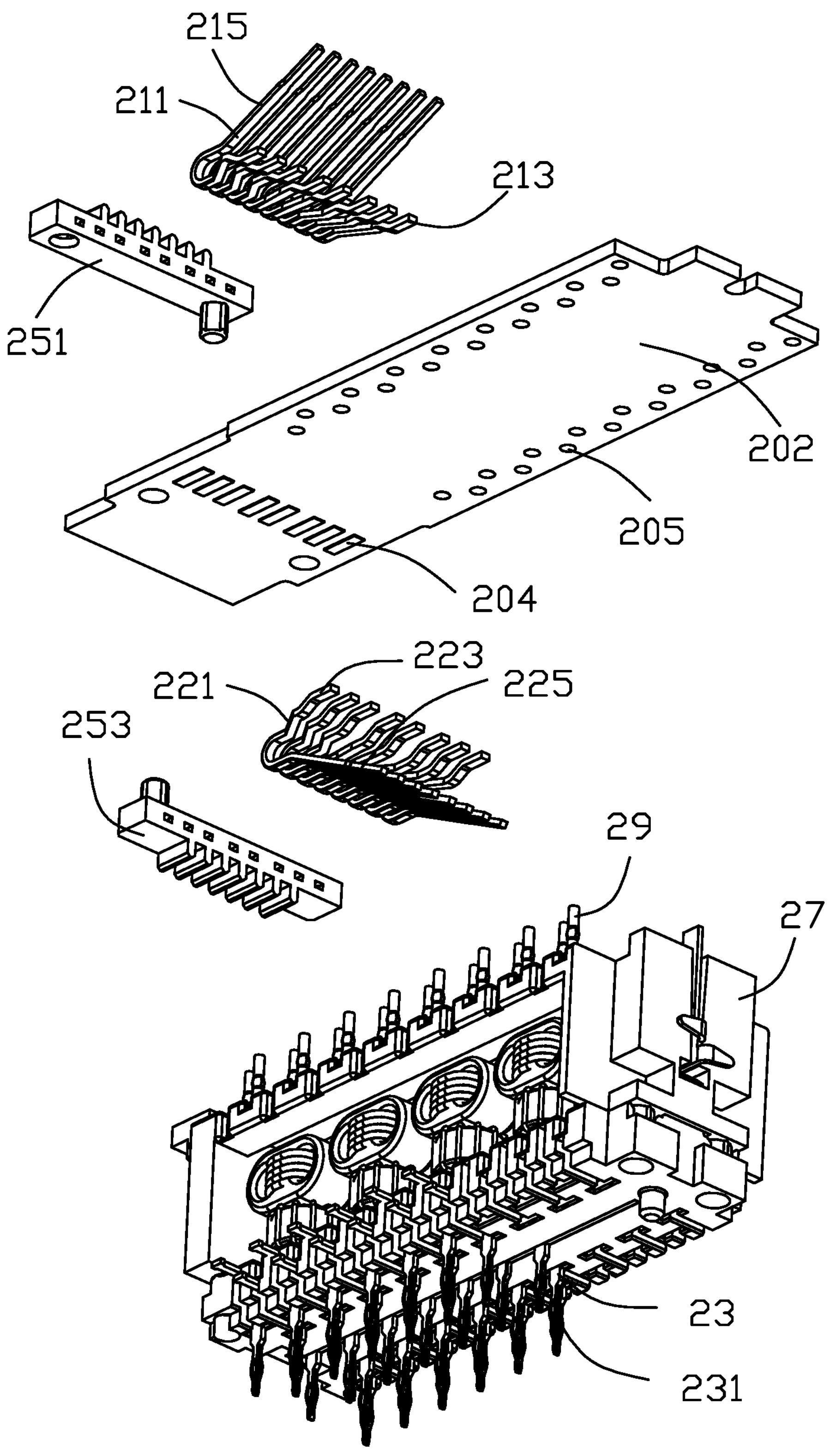
FIG. 12 is another perspective view of a terminal module of the electrical connector in FIG. 11.
Figure 13:
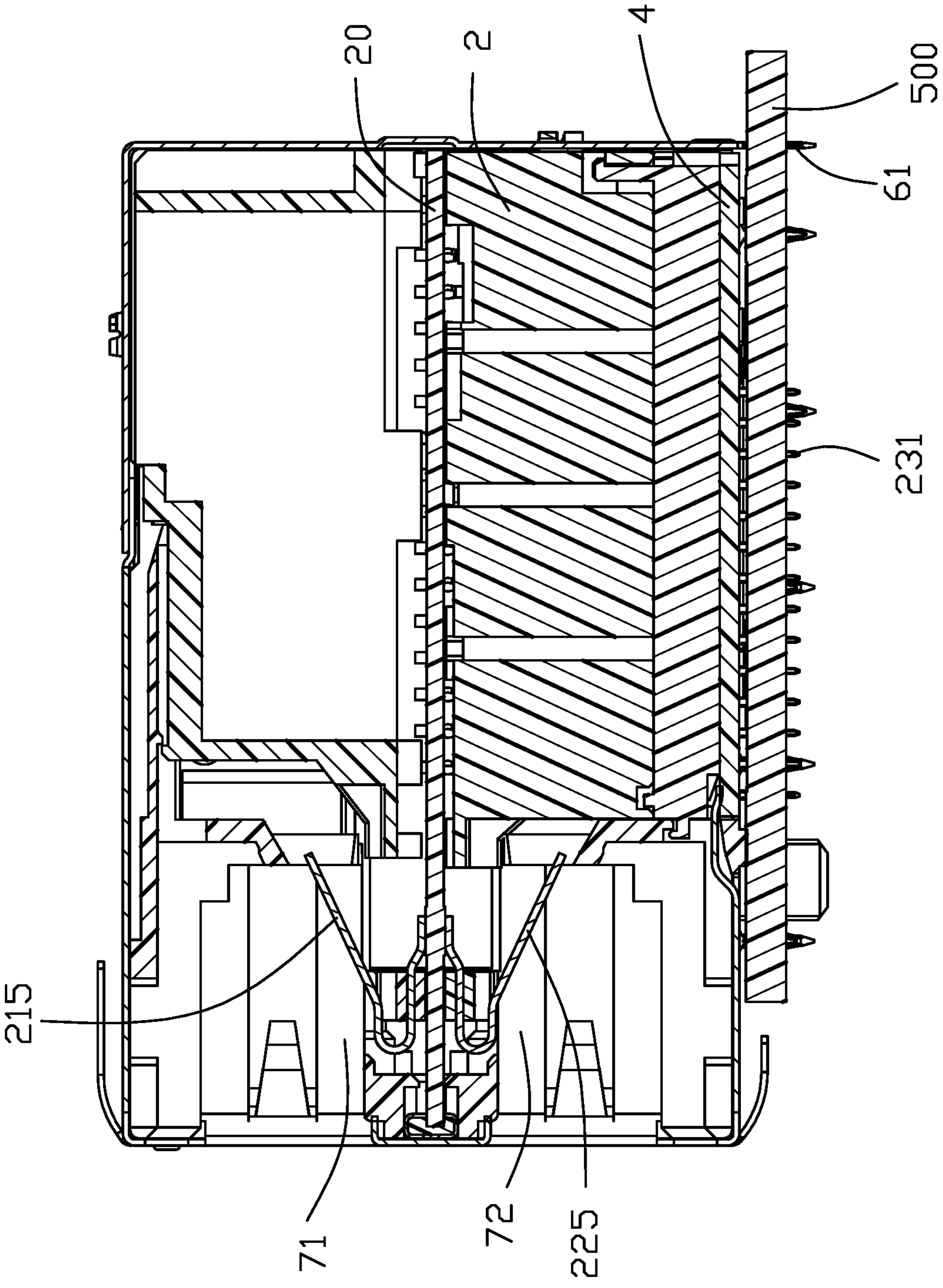
FIG. 13 is a cross-sectional view of the electrical connector and the external circuit board taken along line A-A in FIG. 1.

Referring to FIGS. 1-13, an electrical connector 100 of the present invention is shown. The electrical connector 100 can be mated with a mating connector (not shown) and can be mounted on the external circuit board 500. The electrical connector 100 is an RJ45 socket connector.

The electrical connector 100 comprises an insulating body 1, a terminal module 2 assembled in the insulating body 1, a positioning member 4 located on the lower side of the insulating body 1, and a metal shielding shell 6 covering the outside of the insulating body 1 and the terminal module 2. The terminal module 2 is embodied as a 20G module and includes a sub-circuit board 20 and pin terminals 23 electrically connected to the sub-circuit board 20, the pin terminals 23 including downwardly extending pins 231 mounted on the external circuit board 500. The positioning member 4 is provided with through holes 41 through which the pins 231 can pass. The shielding shell 6 is assembled from a front part and a rear part. The bottom edge of the shielding shell 6 is provided with a number of mounting feet 61 which are mounted on the external circuit board 500.

The electrical connector 100 includes a plurality of receiving spaces 7 arranged in the lateral direction and in the vertical direction for the insertion of the mating connector, and the center distance D between the two adjacent receiving spaces 7 in the lateral direction is 13.97 mm. In the up-down direction, the receiving space 7 includes an upper receiving space 71 and a lower receiving space 72 arranged in a stack. Each of the receiving spaces 7 can respectively receive a corresponding mating connector. According to requirements, the electrical connector 100 may further include a shielding member 8 between adjacent terminal modules 2 and a light guide 9 extending from the rear to the front. The shielding member 8 includes a metal body 81 and a cladding body 82 covering the metal body 81.

The insulating body 1 includes a row of upper receiving spaces 11 and a row of lower receiving spaces 12 located at the front corresponding to the receiving spaces 7. The upper receiving space 11 and the lower receiving space 12 can be used for horizontal insertion of a mating plug connector (not shown) in the front-rear direction. Each of the terminal modules 2 is correspondingly installed in one upper receiving space 11 or one lower receiving space 12.

The terminal module 2 can be replaced with different types of terminal modules as required, and the arrangement of the pins 231 of each of the different types of terminal modules 2 is the same. The pins of different terminal modules 2 can be installed in the corresponding through holes 41 of the same positioning member 4 to be mounted on the same external circuit board 500. Different types of the terminal modules 2 can correspondingly support 1G or 2.5G or 5G or 10G or 25G or 40G signal transmission. The present invention is described in detail by taking two types of terminal modules among different types of terminal modules as examples.

Referring to FIGS. 1-13, it is an embodiment of the first terminal module. In this embodiment, the terminal module 2 further includes a sub-circuit board 20 arranged horizontally, and a mating terminal 21 mounted on the front of the sub-circuit board 20 and mating with the mating connector. The sub-circuit board 20 includes an upper surface 201 and a lower surface 202 on the opposite side of the upper surface 201. A row of upper conductive sheets 203 is provided on the front upper surface 201 of the sub-circuit board 20. A row of lower conductive sheets 204 is provided on the front lower surface 202 of the sub-circuit board 20. The left and right sides of the sub-circuit board 20 are provided with two rows of terminal holes 205 along the front and rear directions. The mating terminals 21 include upper mating terminals 211 and lower mating terminals 221. The terminal module 2 further includes an upper fixing member 251 for fixing the upper mating terminals 211 as a whole, and a lower fixing member 253 for fixing the lower mating terminals 221 as a whole. The upper mating terminals 211 are disposed in the upper receiving space 11, and the lower mating terminals 221 are disposed in the lower receiving space 12. Each of the upper mating terminals 211 has an upper mounting portion 213 and an upper mating portion 215. The upper mating portion 215 extends into the upper receiving space 11, and the upper mounting portion 213 is welded on the upper conductive sheets 203 of the sub-circuit board 20. The lower mating terminal 221 has a lower mounting portion 223 and a lower mating portion 225. The lower mating portion 225 extends into the lower receiving space 12, and the surface of the lower mounting portion 223 is welded on the lower conductive sheet 204 of the sub-circuit board 20. The upper fixing member 251 is mounted on the upper surface 201 of the sub-circuit board 20, and the lower fixing member 253 is mounted on the lower surface 202 of the sub-circuit board 20. The upper mating terminal 211 and the upper fixing member 251 are integrally formed, and the lower mating terminal 221 and the lower fixing member 253 are integrally formed. Further, the terminal module 2 includes an insulating carrier 27 with an accommodating cavity 271 located under the rear of the sub-circuit board 20, a magnetic module 28 accommodated in the accommodating cavity 271, mounted on the upper end of the insulating carrier 27 and connect upward to the intermediate terminal 29 of the sub-circuit board 20. The pin terminal 23 is mounted on the lower end of the insulating carrier 27. The intermediate terminal 29 is extended upward and installed in the terminal hole 205 of the sub-circuit board 20. The pins 231 are in the shape of fish eyes, and extend downward from the insulating carrier 27 and the positioning member 4. Electronic components such as capacitors and resistors may also be provided on the sub-circuit board 20.

Figure 14:
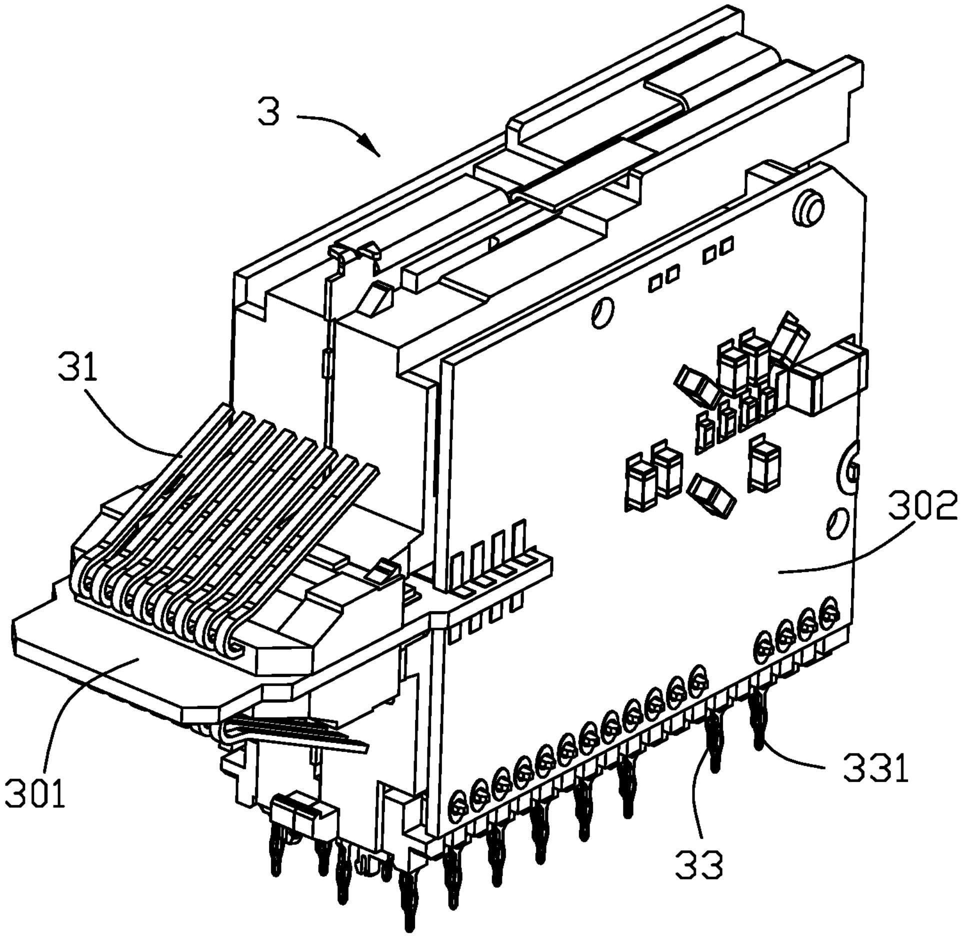
FIG. 14 is a perspective view of another terminal module of the electrical connector in FIG. 1.
Figure 15:
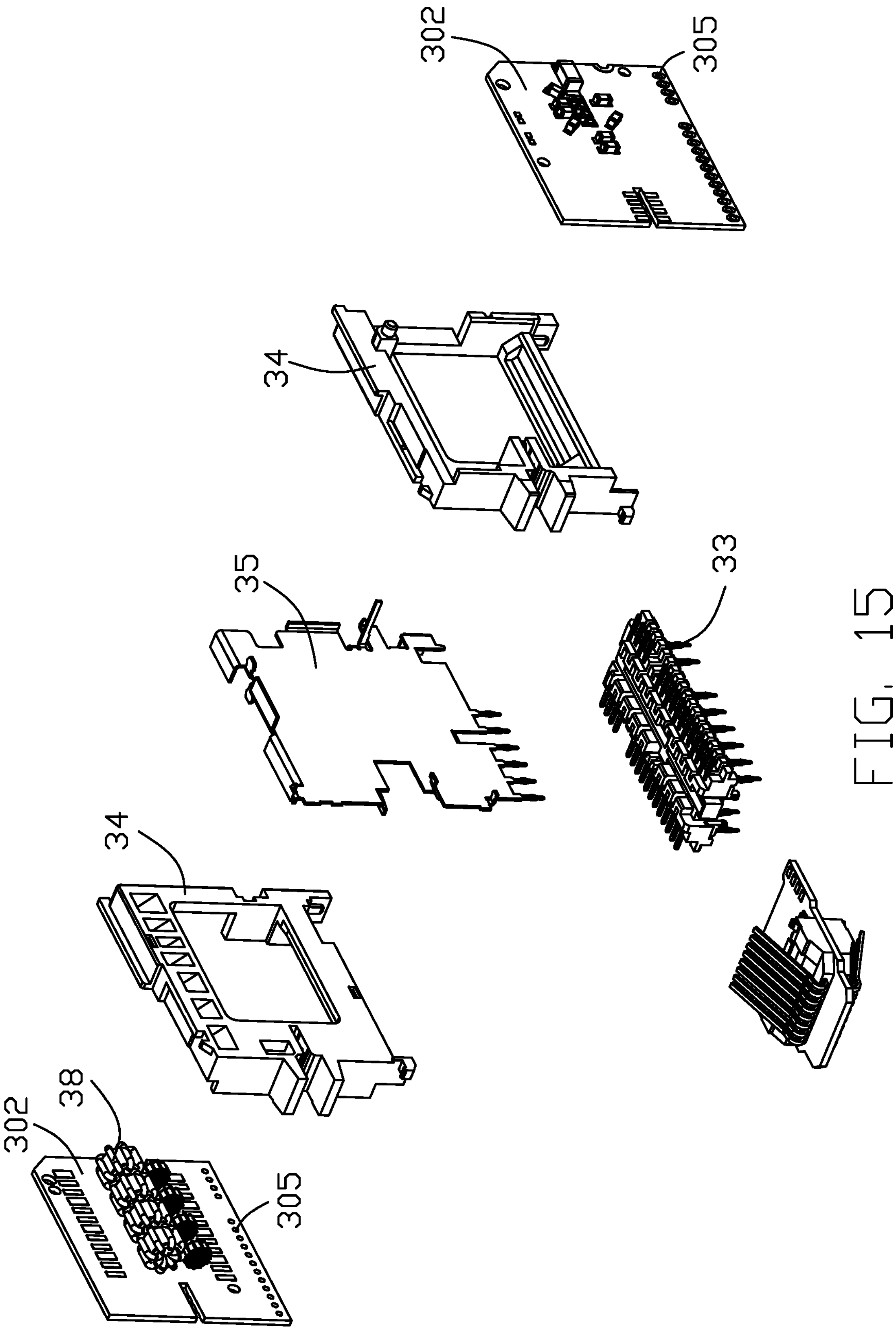
FIG. 15 is an exploded view of another terminal module in FIG. 14.

Referring to FIGS. 14-15, it is an embodiment of the second terminal module. In this embodiment, the terminal module 3 is embodied as a 10G module and includes a horizontal circuit board 301 arranged horizontally at the front, a pair of vertically arranged vertical circuit boards 302 located at the rear of the horizontal circuit board 301 and connected with the horizontal circuit board 301, the mating terminal 31 for mating with the mating connector on the horizontal circuit board 301, the magnetic module 38 mounted on the vertical circuit board 302, the pin terminal 33 mounted on the vertical circuit board 302, and a pair of holding brackets 34 and a shielding sheet 35 located between the pair of holding brackets 34. The pair of holding brackets 34 are respectively mounted on the corresponding vertical circuit boards 302. The pin terminals 33 include downwardly extending pins 331 that can be mounted on the vertical circuit board 302. A row of terminal holes 305 is provided on the lower side of each of the vertical circuit boards 302. An end of the pin terminal 33 opposite to the pin 331 is mechanically and electrically mounted in the terminal hole 305 of the vertical circuit board 302. In this embodiment, the horizontal circuit board 301 and the vertical circuit board 302 together form a sub-circuit board of the terminal module.

In the present invention, the electrical connector 100 can be replaced with different types of terminal modules as required, so that the electrical connector dimensions remain unchanged, and the outer metal shielding shell mold is shared, thereby saving the mold opening cost of the outer metal shielding shell. In addition, the present invention can realize the transmission of 10G~40G signals at different rates as long as the internal terminal modules of different rates are replaced, and the external dimensions and pin arrangement remain unchanged. Thereby, electrical connectors that achieve different rates are compatible with the same external circuit board. The external dimensions and pin arrangement of the electrical connector of the present invention are consistent with the current mainstream 10G external dimensions in the market, and customers do not need to redesign the layout of the server or switch panel and mainboard, which can save installation space and cost, and facilitate product upgrades.

What is claimed is:

1. An electrical connector for mounting on an external circuit board, the electrical connector comprising:

an insulating body having an upper receiving space and a lower receiving space;

a terminal module assembled on the insulating body and including a plurality of pin terminals, each pin terminal having a pin for mounting on the external circuit board, wherein the terminal module is either a 10G module or a 25G module, the 10G module has a first pin arrangement pattern, the 25G module has a second pin arrangement pattern, and the first pin arrangement pattern and the second pin arrangement pattern are same in order to be mounted on the same external circuit board.

2. The electrical connector as claimed in claim 1, further comprising a positioning member located on a lower side of the insulating body for the pins to extend through.

3. The electrical connector as claimed in claim 1, further comprising a metal shielding shell covering the insulating body.

4. The electrical connector as claimed in claim 1, wherein the terminal module comprises a sub-circuit board and a plurality of mating terminals mounted on the sub-circuit board.

* * * * *